(12) United States Patent
Leu

(10) Patent No.: US 10,673,317 B2
(45) Date of Patent: Jun. 2, 2020

(54) SOFT-SWITCHING LOW INPUT CURRENT-RIPPLE POWER INVERSION CIRCUITS

(71) Applicant: Ching-Shan Leu, Taoyuan (TW)

(72) Inventor: Ching-Shan Leu, Taoyuan (TW)

( * ) Notice: Subject to any disclaimer, the term of this patent is extended or adjusted under 35 U.S.C. 154(b) by 0 days.

(21) Appl. No.: 16/432,914

(22) Filed: Jun. 5, 2019

(65) Prior Publication Data

US 2020/0044559 A1     Feb. 6, 2020

(30) Foreign Application Priority Data

Aug. 1, 2018   (TW) ............... 107126662 A

(51) Int. Cl.
*H02M 3/335* (2006.01)
*H02M 1/15* (2006.01)
*H02M 1/00* (2006.01)

(52) U.S. Cl.
CPC ......... *H02M 1/15* (2013.01); *H02M 3/33592* (2013.01); *H02M 2001/0054* (2013.01)

(58) Field of Classification Search
CPC . H02M 2001/0054; H02M 2001/0058; H02M 1/15; H02M 1/32; H02M 3/33592; H02M 2007/4815
See application file for complete search history.

(56) References Cited

U.S. PATENT DOCUMENTS 5,038,267 A   8/1991 De Doncker et al.
5,640,318 A * 6/1997 Leu ................... H02M 3/3353
                                                363/131
5,907,479 A * 5/1999 Leu ................... H02M 3/3353
                                                363/131

(Continued)

FOREIGN PATENT DOCUMENTS

| CN | 101640498 A | 2/2010 |
|---|---|---|
| TW | 556402 B | 10/2003 |
| TW | 201034364 A | 9/2010 |

OTHER PUBLICATIONS

C.-S. Leu, "Improved forward topologies for DC-DC applications with built-in input filter," Jan. 2006. URL: https://vtechworks.lib.vt.edu/handle/10919/26073 (Year: 2006).*

*Primary Examiner* — Kyle J Moody
*Assistant Examiner* — Jye-June Lee
(74) *Attorney, Agent, or Firm* — CKC & Partners Co., LLC

(57) ABSTRACT

A soft-switching and low input current ripple inverter circuit is disclosed. It includes two paralleled dual-switch forward inverter circuits with a single transformer, two clamping diodes, and one coupling capacitor. It has voltage-clamping function on the switches with a lossless snubber at the turn-off instant and provides enough leakage energy to achieve zero-voltage switching operation with low input current ripple feature. Two set of the driver signals with 180 phase shift each other are used to control the switches of said first and second dual-switch forward inverters, respectively. Each set of driver signals includes one PWM signal (D) and one near 50% duty cycle driver signal. Employing the proposed inverter circuit, the switch's turn-on voltage can be reduced to half input voltage compared to its prior art circuits. Consequently, the switching losses are thus reduced and efficiency is improved, especially in light-load operation.

18 Claims, 14 Drawing Sheets

(56) References Cited

U.S. PATENT DOCUMENTS

| | | | | |
|---|---|---|---|---|
| 6,005,779 | A  * | 12/1999 | Cohen | H02M 7/537 363/126 |
| 6,008,997 | A  * | 12/1999 | Cohen | H02M 3/3382 363/132 |
| 6,927,987 | B2 * | 8/2005 | Farrington | H02M 3/33569 363/56.02 |
| 7,262,979 | B2 | 8/2007 | Wai et al. | |
| 7,515,439 | B2 | 4/2009 | Leu | |
| 7,957,161 | B2 | 6/2011 | Leu | |
| 8,259,469 | B2 * | 9/2012 | Leu | H02M 7/48 363/15 |
| 8,665,616 | B2 | 3/2014 | Leu et al. | |
| 9,473,045 | B2 | 10/2016 | Leu | |
| 2005/0190583 | A1 | 9/2005 | Morimoto et al. | |
| 2008/0025051 | A1 * | 1/2008 | Leu | H02M 3/33569 363/20 |
| 2009/0257254 | A1 * | 10/2009 | Leu | H02M 1/34 363/40 |
| 2010/0226154 | A1 * | 9/2010 | Leu | H02M 1/34 363/106 |
| 2011/0163599 | A1 * | 7/2011 | Leu | H02M 3/155 307/31 |
| 2011/0199802 | A1 * | 8/2011 | Leu | H02M 1/34 363/131 |

* cited by examiner

SOFT-SWITCHING LOW INPUT CURRENT-RIPPLE POWER INVERSION CIRCUITS

RELATED APPLICATIONS

This application claims priority to Taiwanese Application Serial Number 107126662, filed Aug. 1, 2018, which is herein incorporated by reference.

BACKGROUND OF THE INVENTION

Field of Invention

The present invention relates to power inversion circuits, more particularly to power inversion circuits having low input current-ripple and low switching loss under full line and load operating conditions.

Description of Related Art

DC-DC converter is widely used in today's electrical device. By using an inversion circuit cascaded with a rectification circuit and a filter circuit, the DC voltage is inverted to an AC voltage and the AC voltage is then rectified and filtered to the required DC voltage.

Among several inversion topologies, the full-bridge topology has low voltage and current stresses on semiconductors so that it is widely used for high input-voltage medium-to-high power conversion applications.

However, full-bridge topology has a pulsating input current waveform, which is a common characteristic of buck-derived converters. This pulsating input current generates high di/dt (rate of current change) noise. Consequently, a large EMI filter stage must be added to meet the EMI regulation, which increases the cost and occupies space in the converter.

To reduce input current-ripple with its related di/dt noises, several ripple reduction converters have been invented recently, such as in U.S. Pat. No. 7,515,439, issued on Apr. 7, 2009, in U.S. Pat. No. 7,957,161, issued on Jun. 7, 2011, in U.S. Pat. No. 8,259,469, issued on Sep. 4, 2012, in U.S. Pat. No. 8,665,616, issued on Mar. 4, 2014, in U.S. Pat. No. 9,473,045, issued on Oct. 18, 2016, all to the inventor of the present invention. Among them, the full-bridge converter with input current ripple reduction (FBC-CRR) preserves the advantages of the FBC through the use of a current ripple reduction mechanism as shown in FIG. 2(c) and FIG. 3(c) of the U.S. Pat. No. 7,515,439. Due to its reduced input current ripple, therefore, a smaller EMI filter stage can be used instead.

Generally, the design consideration of a high frequency inversion circuit is based on the trade-off between the switching loss and the conduction loss under full line and/or load operation conditions. A certain ZVS range, such as 40% to 100% load range, is thus determined to optimize the overall converter efficiency. Out of the ZVS operating conditions, especially the light-load condition, the efficiency are degraded and none of the effective solution has been proposed yet.

Accordingly, the present invention discloses a family of inversion circuit having half input-voltage on each switch at the turn-on instant under full line and/or load operating conditions. It minimizes the output capacitance energy and additional enhanced soft-switching operation performance can be obtained with less required leakage inductance energy

SUMMARY OF THE INVENTION

An object of the present invention is to provide an inversion circuit having low input current ripple.

Another object of the present invention is to provide an inversion circuit having half input-voltage on each switch at the turn-on instant under full line and/or load operating conditions. Therefore, switching loss can be reduced or ZVS operation can be achieved with less leakage inductance energy. Further efficiency improvements can thus be obtained.

Other objects, advantages, and novel features of the invention will become more apparent from the following detailed description when taken in conjunction with the accompanying drawings.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF PREFERRED EMBODIMENTS

Figure 1A:
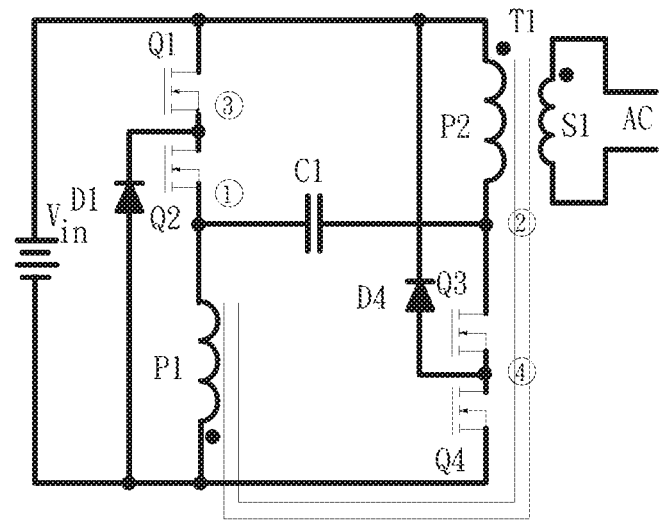
FIG. 1A and FIG. 1B show a single-transformer DC-AC inversion circuit diagram with its gate driver timing diagram as the first example according to the first embodiment of the present invention, respectively.

FIG. 1A shows a single-transformer DC-AC inversion circuit as the first example of the first embodiment of the present invention. It comprises two sets of series circuits, two clamped diodes and one coupling capacitor.

A voltage source, Vin, provides a DC input to the inversion circuit. Two series circuits are parallel-connected with the DC input. The first series circuit includes the first switch pair, Q1-Q2, and the first transformer primary P1. The second series circuit includes the second transformer primary P2 and the second switch pair, Q3-Q4. The transformer T1 has two primary windings (P1 and P2) and at least one secondary winding S1. The primary windings P1 and P2 of transformer T1 have equal number of turns. The dot terminals of the first and second primary windings P1 and P2 are connected to the negative and the positive terminals of the DC input voltage Vin, respectively. The two terminals of the clamping capacitor C1 are connected to the non-dot terminals of the first primary P1 and second primary P2, respectively.

Figure 1B:
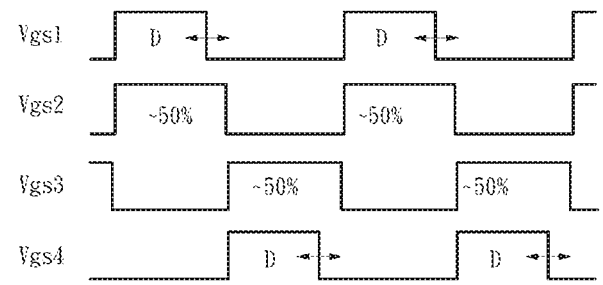

A pulse-width modulation controller will generate two interleaved pairs of gate driver signal applied to the inversion circuit. Each pair has two synchronized gate driver signals with one pulse-width-modulation signal (D) and one near 50% duty cycle signal (~50%). As shown in FIG. 1B, four gate driver signals (D, ~50%, ~50%, D) are assigned to turn-on and turn-off the Q1, Q2, Q3, and Q4, respectively.

The anode and cathode of the first clamped diode D1 are respectively connected to the negative terminal of the input voltage source Vin and the midpoint of the first switch pair Q1-Q2. The anode and cathode of the second clamped diode are respectively connected to the midpoint of the second switch pair Q3-Q4 and the positive terminal of the input voltage source Vin.

At least one transformer secondary winding magnetically coupled to transformer primary windings. As a result of the sequential operation of Q1-Q2 and Q3-Q4, an AC voltage will be generated that will be available from the secondary winding.

Figure 1C:
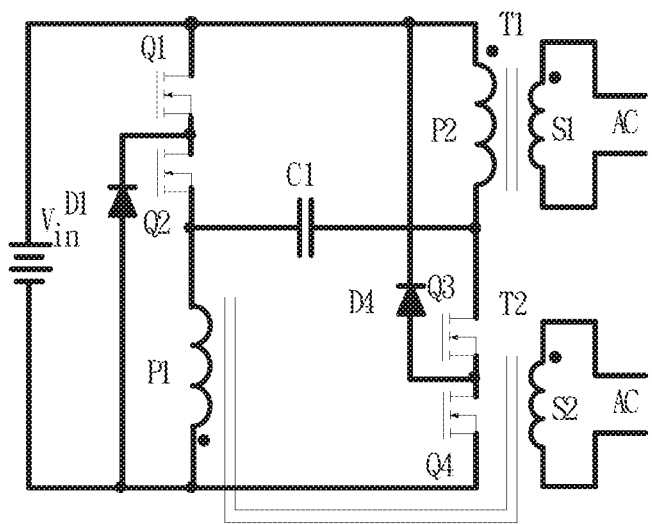
FIG. 1C shows a dual-transformer DC-AC inversion circuit diagram as the second example according to the first embodiment of the present invention.

The second example of the first embodiment to that shown in FIG. 1A is depicted in FIG. 1C. The single transformer T1 has been replaced with dual transformers T1 and T2 for high output power applications. Primary winding P2 and secondary winding S1 are coupled to the first transformer T1 while primary winding P1 and secondary winding S2 are coupled to the second transformer T2. Secondary windings S1 and S2 may be connected in parallel or in series to generate the required AC voltage.

Figure 2A:
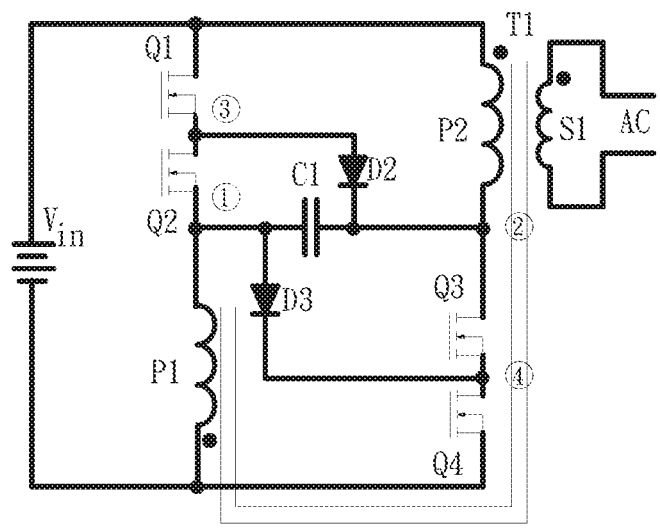
FIG. 2A and FIG. 2B show a single-transformer DC-AC inversion circuit diagram with its gate driver timing diagram as the third example according to the first embodiment of the present invention, respectively.

The third example of the first embodiment is depicted in FIG. 2A. As shown, the first clamped diode and the second clamped diode connections with four-gate driver signal assignment are different from that of the circuit shown FIG. 1A and FIG. 1B.

Figure 2B:
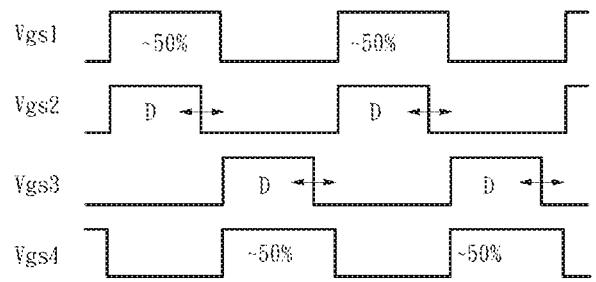

As shown in FIG. 2B, four gate driver signals (~50%, D, D, ~50%) are assigned to turn-on and turn-off the Q1, Q2, Q3, and Q4, respectively.

The anode and cathode of the first clamped diode D2 are respectively connected to the midpoint of the first switch pair Q1-Q2 and the non-dot terminal of the second primary winding P2. The anode and cathode of the second clamped diode D3 are respectively connected to the non-dot terminal of the first primary winding P1 and the midpoint of the second switch pair Q3-Q4.

Figure 2C:
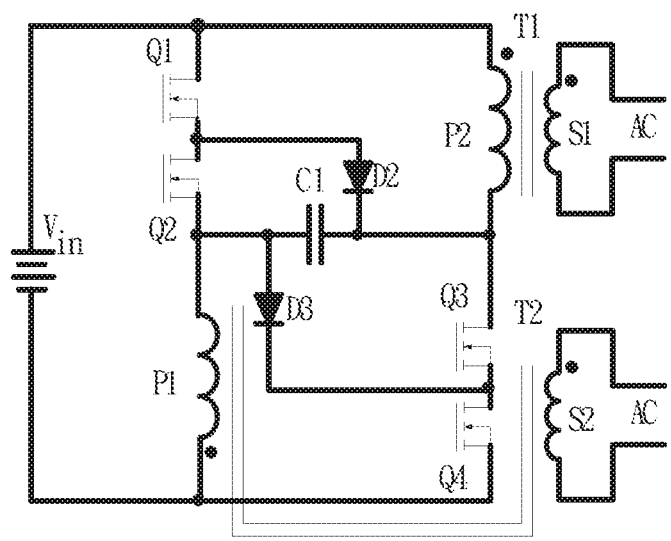
FIG. 2C shows a dual-transformer DC-AC inversion circuit diagram as the fourth example according to the first embodiment of the present invention.

The fourth example of the first embodiment to that shown in FIG. 2A is depicted in FIG. 2C. The single transformer T1 has been replaced with dual transformers T1 and T2 for high output power applications. Primary winding P2 and secondary winding S1 are coupled to the first transformer T1 while primary winding P1 and secondary winding S2 are coupled to the second transformer T2. Secondary windings S1 and S2 may be connected in parallel or in series to generate the required AC voltage.

Figure 3A:
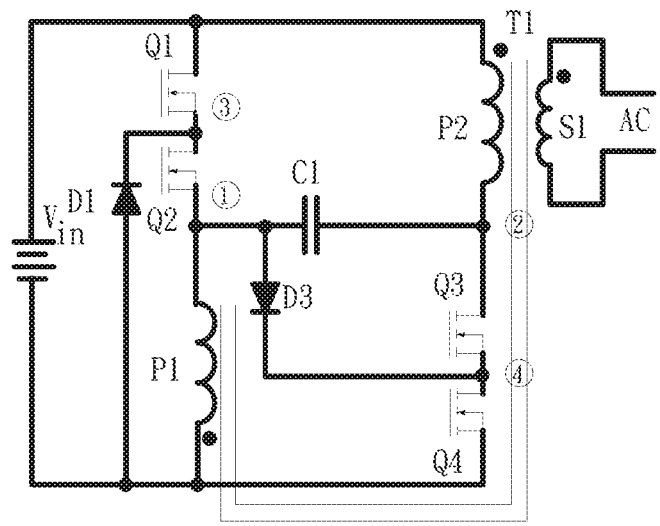
FIG. 3A and FIG. 3B show a single-transformer DC-AC inversion circuit diagram with its gate driver timing diagram as the fifth example according to the first embodiment of the present invention, respectively.

The fifth example of the first embodiment is depicted in FIG. 3A. As shown, the first clamped diode and the second clamped diode connections with four-gate driver signal assignment are different from that of the circuit shown FIG. 1A and FIG. 1B.

Figure 3B:
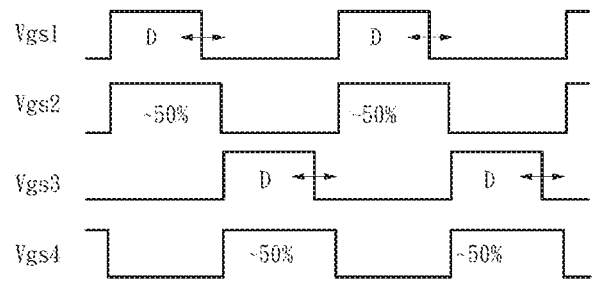

As shown in FIG. 3B, four gate driver signals (D, ~50%, D, ~50%) are assigned to turn-on and turn-off the Q1, Q2, Q3, and Q4, respectively.

The anode and cathode of the first clamped diode D1 are respectively connected to the negative terminal of the input voltage source and the midpoint of the first switch pair Q1-Q2. The anode and cathode of the second clamped diode D3 are respectively connected to the non-dot terminal of the first primary winding P1 and the midpoint of the second switch pair Q3-Q4.

Figure 3C:
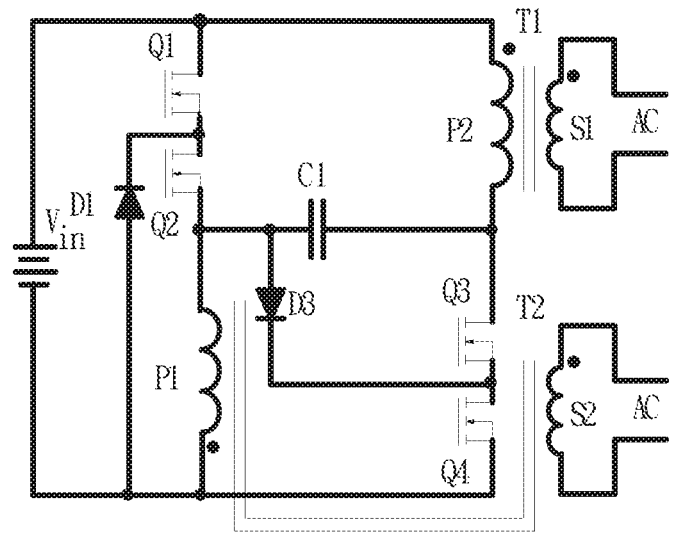
FIG. 3C shows a dual-transformer DC-AC inversion circuit diagram as the sixth example according to the first embodiment of the present invention.

The sixth example of the first embodiment to that shown in FIG. 3A is depicted in FIG. 3C. The single transformer T1 has been replaced with dual transformers T1 and T2 for high output power applications. Primary winding P2 and secondary winding S1 are coupled to the first transformer T1 while primary winding P1 and secondary winding S2 are coupled to the second transformer T2. Secondary windings S1 and S2 may be connected in parallel or in series to generate the required AC voltage.

Figure 4A:
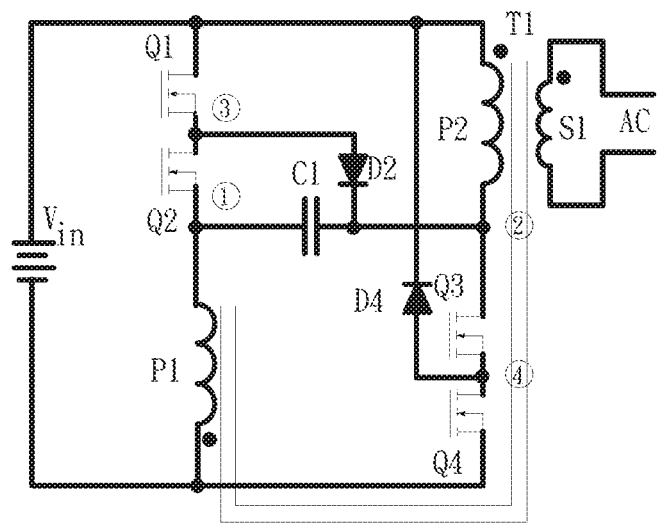
FIG. 4A and FIG. 4B show a single-transformer DC-AC inversion circuit diagram with its gate driver timing diagram as the seventh example according to the first embodiment of the present invention, respectively.

The seventh example of the first embodiment is depicted in FIG. 4A. As shown, the first clamped diode and the second clamped diode connections with four-gate driver signal assignment are different from that of the circuit shown FIG. 1A and FIG. 1B.

Figure 4B:
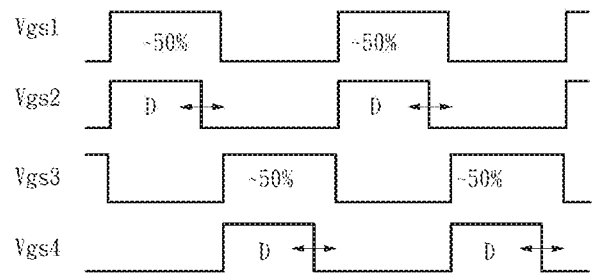

As shown in FIG. 4B, four gate driver signals (~50%, D, ~50%, D) are assigned to turn-on and turn-off the Q1, Q2, Q3, and Q4, respectively.

The anode and cathode of the first clamped diode D2 are respectively connected to the midpoint of the first switch pair Q1-Q2 and the non-dot terminal of the second primary winding P2. The anode and cathode of the second clamped diode D4 are respectively connected to the midpoint of the second switch pair Q3-Q4 and the positive terminal of the input voltage source.

Figure 4C:
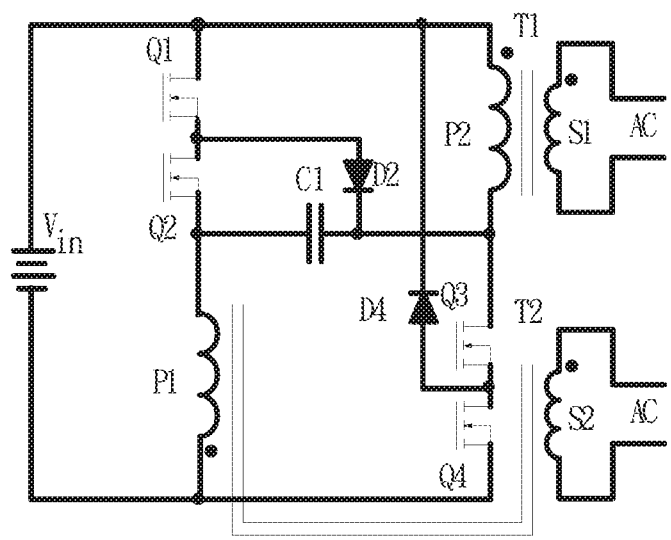
FIG. 4C shows a dual-transformer DC-AC inversion circuit diagram as the eighth example according to the first embodiment of the present invention.

The eighth example of the first embodiment to that shown in FIG. 4A is depicted in FIG. 4C. The single transformer T1 has been replaced with dual transformers T1 and T2 for high output power applications. Primary winding P2 and secondary winding S1 are coupled to the first transformer T1 while primary winding P1 and secondary winding S2 are coupled to the second transformer T2. Secondary windings S1 and S2 may be connected in parallel or in series to generate the required AC voltage.

Although the inversion circuits as shown from FIG. 1A to FIG. 4C are operated with four different clamped diode connections with their respective gate diver signals assigned to the switches or with one or two transformers for different output power applications, these circuits will share the same operating principle. Accordingly, it will be only described by using the circuit as shown in FIG. 1A, the first example of the first embodiment of the present invention.

FIG. 5A to FIG. 5F show the equivalent circuits under stead-state operating conditions according to the first example of the first embodiment of the present invention. It has six operating stages.

Figure 5A:
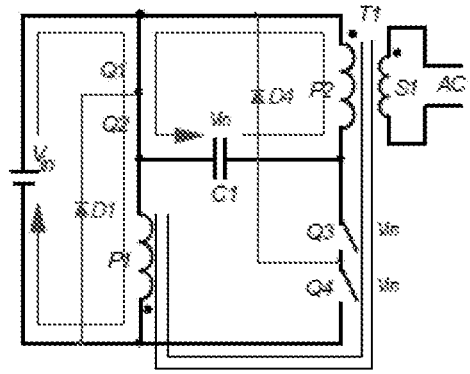
FIG. 5A to FIG. 5F show six equivalent circuits of the DC-AC inversion circuit in FIG. 1A under steady-state operating conditions when the switches are turned on and turned off, respectively.

Referring to FIG. 5A, the drive signals generated by the controller turn on both Q1 and Q2. Therefore, the voltage source Vin provides the voltage on the first primary winding P1. At the same time, the voltage across the coupling capacitor C1 provides the voltage of the second primary winding P2. In this time interval, the coupling capacitor C1 is discharged its energy to the load.

Figure 5B:
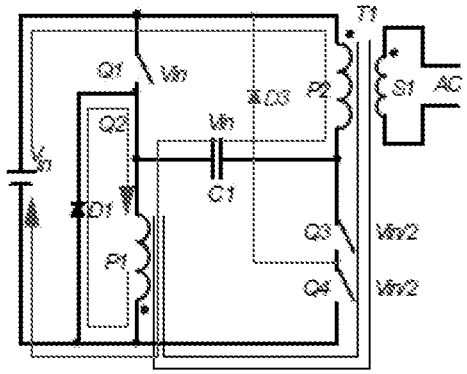

Referring to FIG. 5B, the pulse width modulation signal D generated by the controller turns Q1 off, but keeps Q2 on, and the coupling capacitor C1 will be charged to the voltage source Vin. The voltage on the Q1 will rise. When the voltage is higher than the input voltage, the first clamped diode D1 is turned on due to the forward bias. Therefore, the first primary winding P1 of the transformer is short-circuited. The first primary winding and the second primary winding have the same number of turns. Since the voltage of the first primary winding is opposite to the polarity of the voltage of the second primary winding, they cancel each other out. Therefore, the average voltage across the coupling capacitor C1 is equal to the input voltage. Check the loop of Vin(+)–Q1–Q2–C1–Q3–Q4–Vin(–), because VQ1=VC1= Vin, and VQ2=0, VQ3+VQ4=Vin, which leads to Vin/2 voltage on Q3 and Q4 in this time interval.

Figure 5C:
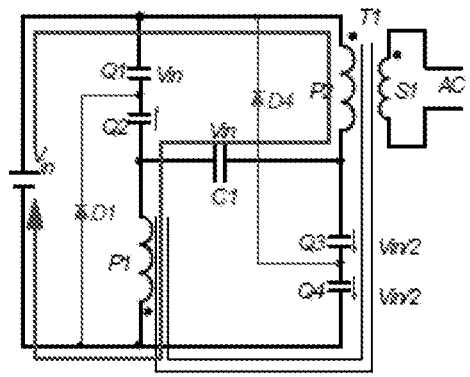

Referring to FIG. 5C, this time interval is the dead time interval. The coupling capacitor C1 is kept charging by the voltage source Vin and the energy stored in the leakage inductance. The near 50% pulse width signal D provided by the controller ends, causing Q2 to turn off. Q2 voltage will rise and Q3 voltage as well as Q4 voltage is dropped. If there is a proper dead time interval and sufficient leakage inductance energy, Q3 and Q4 will achieve zero voltage switching operating condition.

Figure 5D:
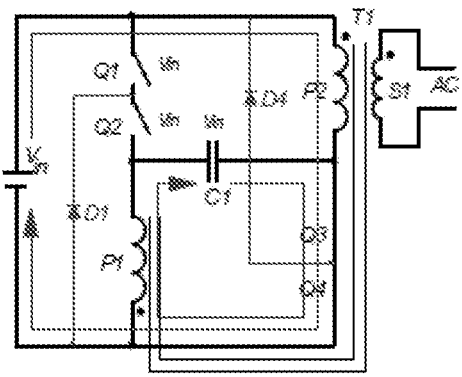

Referring to FIG. 5D, the drive signals generated by the controller turn on both Q3 and Q4. Therefore, the voltage source Vin provides the voltage on the second primary winding P2. At the same time, the voltage across the coupling capacitor C1 provides the voltage on the first primary winding P1. In this time interval, the coupling capacitor C1 is discharged its energy to the load.

Figure 5E:
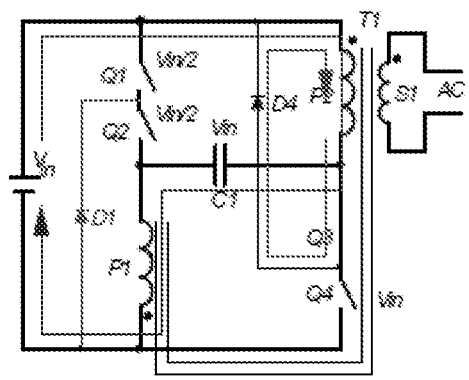

Referring to FIG. 5E, the pulse width modulation signal D generated by the controller turns Q4 off, but keeps Q3 on, and the coupling capacitor C1 will be charged to the voltage source Vin. The voltage on the Q4 will rise. When the voltage is higher than the input voltage, the second clamped diode D4 is turned on due to the forward bias. Therefore, the second primary winding P2 of the transformer is short-circuited. The first primary winding and the second primary winding have the same number of turns. Since the voltage of the first primary winding is opposite to the polarity of the voltage of the second primary winding, they cancel each other out. Therefore, the average voltage across the coupling capacitor C1 is equal to the input voltage. Check the loop of Vin(+)–Q1–Q2–C1–Q3–Q4–Vin(–), because VQ4=VC1= Vin, and VQ3=0, VQ1+VQ2=Vin, which leads to Vin/2 voltage on Q1 and Q2 in this time interval.

Figure 5F:
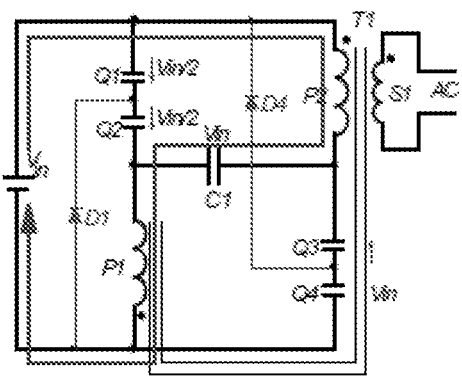

Referring to FIG. 5F, the time interval is the dead time interval. The coupling capacitor C1 is kept charging by the voltage source Vin and the energy stored in the leakage inductance. The near 50% pulse width signal provided by the controller ends, causing Q3 to turn off. Q3 voltage will rise and Q1 voltage as well as Q2 voltage is dropped. If there is a proper dead time interval and sufficient leakage inductance energy, Q1 and Q2 will achieve zero voltage switching operating condition.

Figure 6:
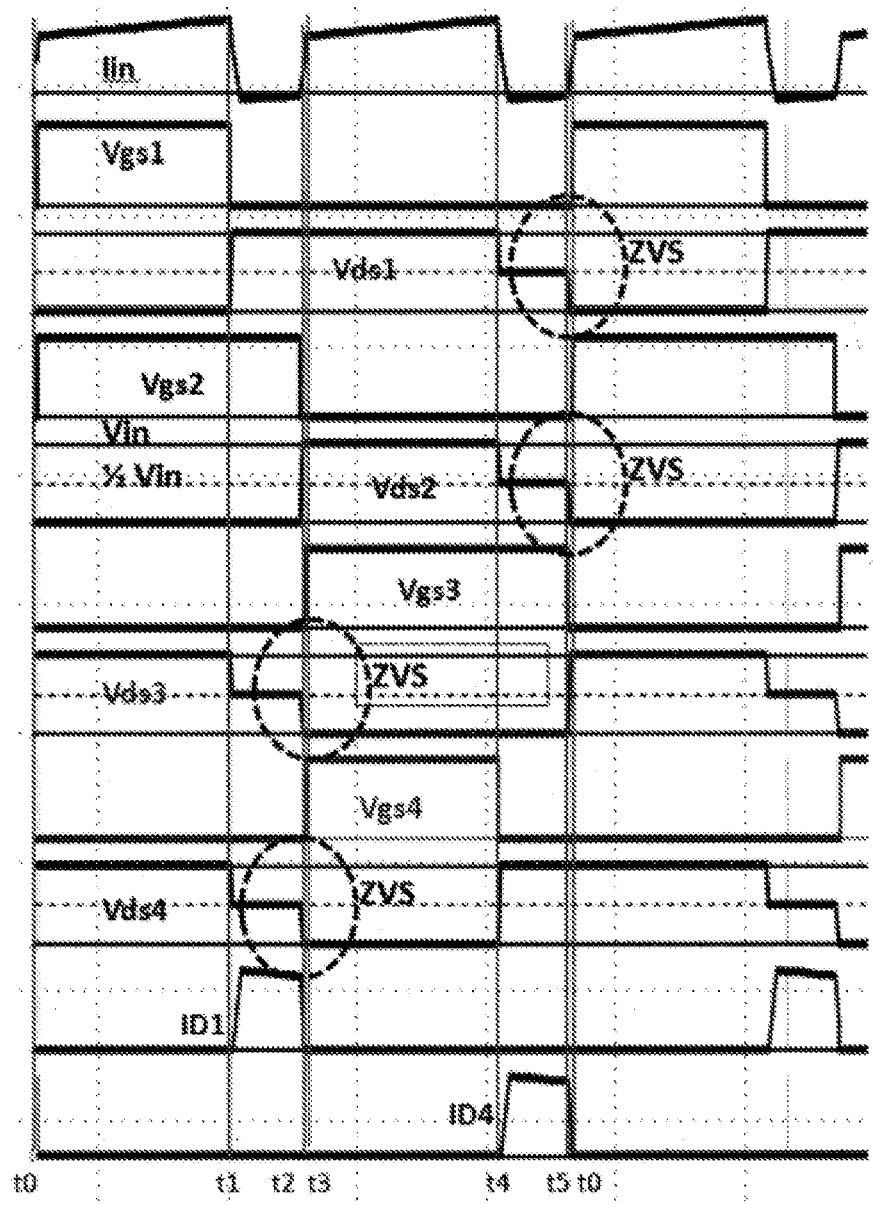
FIG. 6 and FIG. 7 show several key voltage and current waveforms of the DC-AC inversion circuit in FIG. 1(A) under full load and light load operating conditions, respectively.
Figure 7:
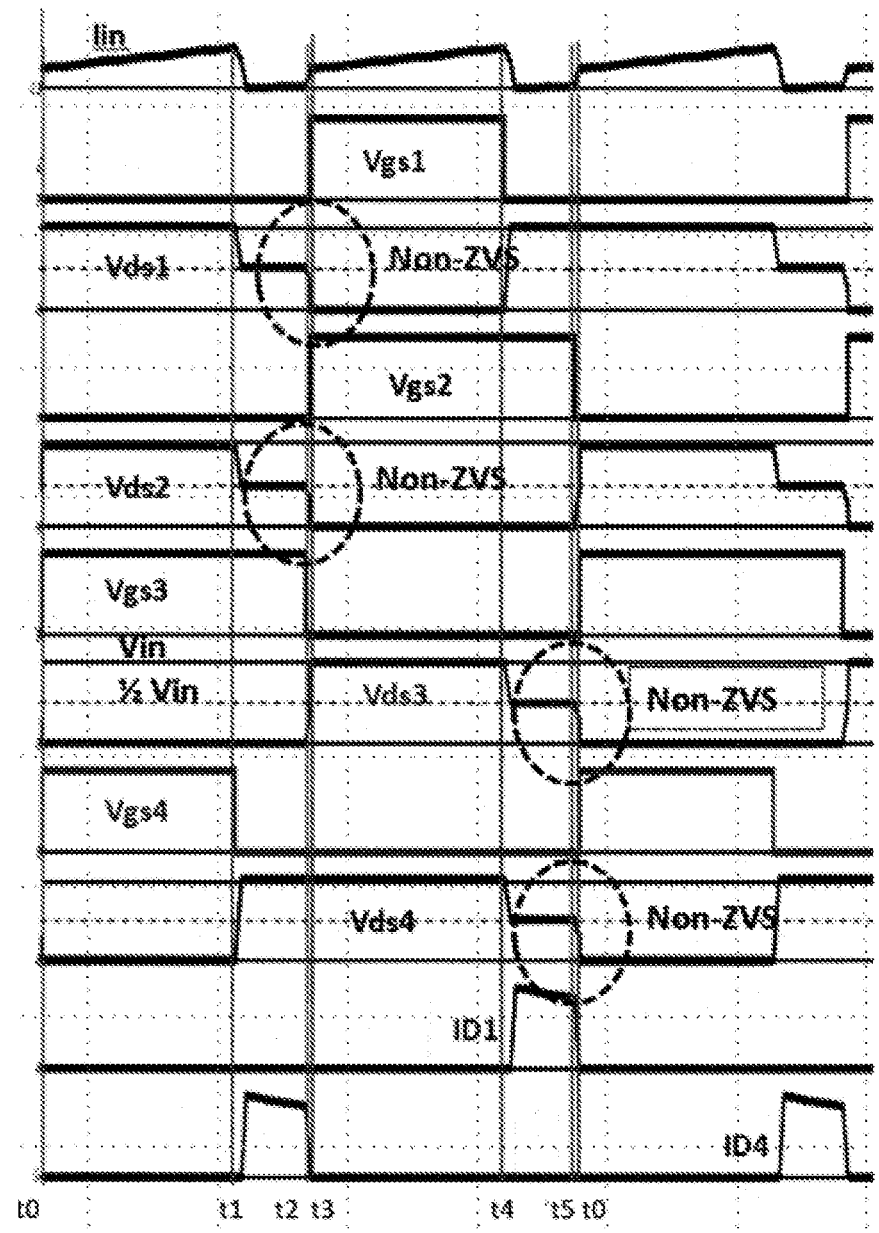

Referring to FIG. 6 and FIG. 7, several key waveforms of the inverter circuit are depicted by running Simplis simulation under heavy load and light load operating conditions, respectively. As shown, ZVS is achieved under heavy load operating condition. On the contrary, it is non-ZVS under light load operation condition. However, the voltage on each switch at the turn-on instant is reduced to half of the input voltage. The switching loss is thus reduced and thereby improving the efficiency under light load operation condition.

Figure 8A:
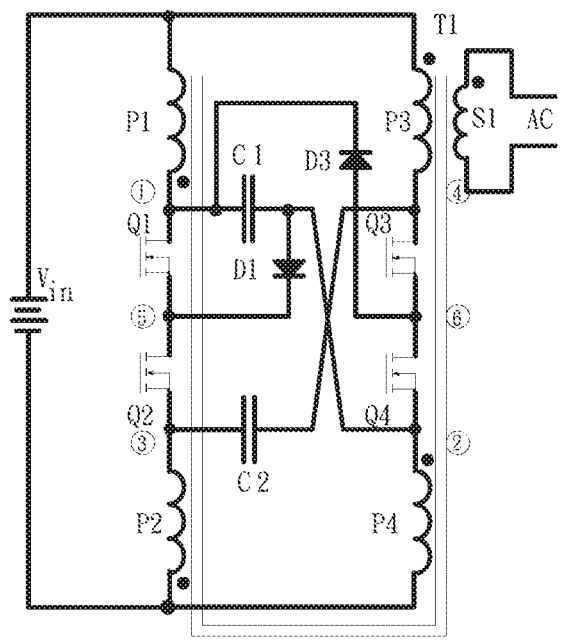
FIG. 8A and FIG. 8B show a single-transformer DC-AC inversion circuit diagram with its gate driver timing diagram as the first example of the second embodiment according to the present invention, respectively.

Referring to FIG. 8A is a single-transformer DC-AC inversion circuit as the first example of the second embodiment of the present invention. It comprises two sets of series circuits, two clamped diodes and two coupling capacitors.

A voltage source, Vin, provides a DC input to the inversion circuit. Two series circuits are parallel-connected with the DC input. The first series circuit includes the first primary winding P1, the first switch pair, Q1-Q2, and the second primary winding P2. The second series circuit includes the third primary winding P3, the second switch pair, Q3-Q4, and the fourth primary winding P4. The transformer T1 has two center-tapped winding pairs, P1-P3 and P4-P2, and at least one secondary winding S1. These four primary windings of transformer T1 have equal number of turns. The dot terminals of the second and third primary windings (P2 and P3) are connected to the negative and the positive terminals of the DC input voltage Vin, respectively. The non-dot terminals of the fourth and first primary windings (P4 and P1) are connected to the negative and the positive terminals of the DC input voltage Vin, respectively. The two terminals of the first clamping capacitor C1 are connected to the dot terminals of the first primary winding P1 and fourth primary winding P4, respectively. The two terminals of the second clamping capacitor C2 are connected to the non-dot terminals of the second primary winding P2 and third primary winding P3, respectively.

Figure 8B:
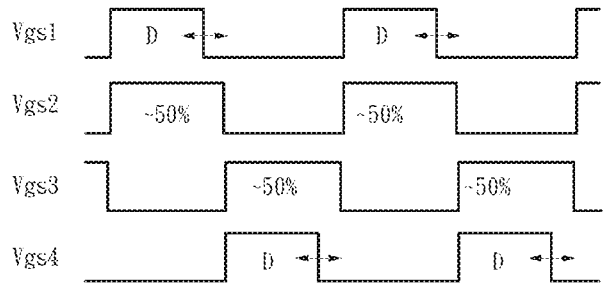

A pulse-width modulation controller will generate two interleaved pairs of gate driver signal applied to the inversion circuit. Each pair has two synchronized gate driver signals with one pulse-width-modulation signal (D) and one near 50% duty cycle signal (~50%). As shown in FIG. 8B, four gate driver signals (D, ~50%, ~50%, D) are assigned to turn-on and turn-off the Q1, Q2, Q3, and Q4, respectively.

The anode and cathode of the first clamped diode D1 are respectively connected to the dot terminal of the fourth primary winding P4 and the midpoint of the first switch pair Q1-Q2. The anode and cathode of the second clamped diode D3 are respectively connected to the midpoint of the second switch pair Q3-Q4 and the dot terminal of the first primary winding P1.

At least one transformer secondary winding magnetically coupled to transformer primary windings. As a result of the sequential operation of Q1-Q2 and Q3-Q4, an AC voltage will be generated that will be available from the secondary winding.

Figure 8C:
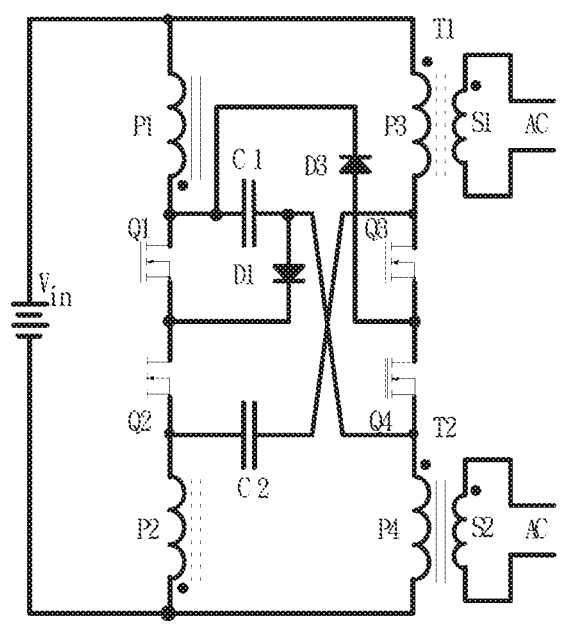
FIG. 8C shows a dual-transformer DC-AC inversion circuit diagram as the second example according to the second embodiment of the present invention.

The second example of the second embodiment to that shown in FIG. 8A is depicted in FIG. 8C. The single transformer T1 has been replaced with dual transformers T1 and T2 for high output power applications. Primary windings P2-P3 and secondary winding S1 are coupled to the first transformer T1 while primary windings P1-P4 and secondary winding S2 are coupled to the second transformer T2. Secondary windings S1 and S2 may be connected in parallel or in series to generate the required AC voltage.

Figure 9A:
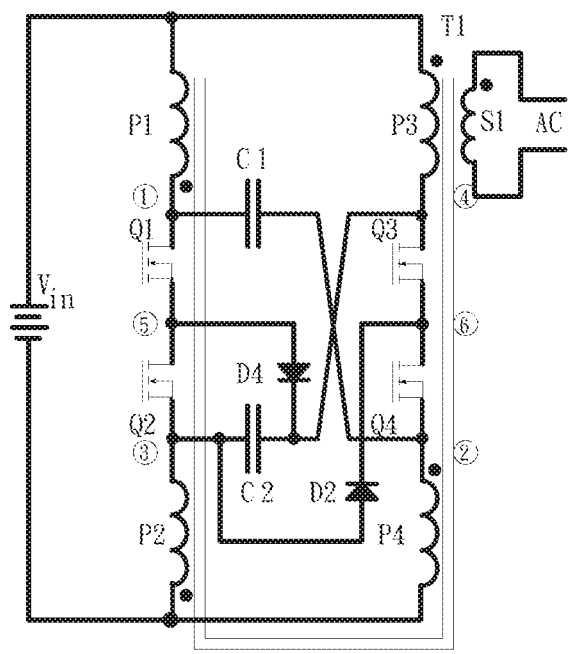
FIG. 9A and FIG. 9B show a single-transformer DC-AC inversion circuit diagram with its gate driver timing diagram as the third example according to the second embodiment of the present invention, respectively.

The third example of the second embodiment is depicted in FIG. 9A. As shown, the first clamped diode and the second clamped diode connections with four-gate driver signal assignment are different from that of the circuit shown FIG. 8A and FIG. 8B.

Figure 9B:
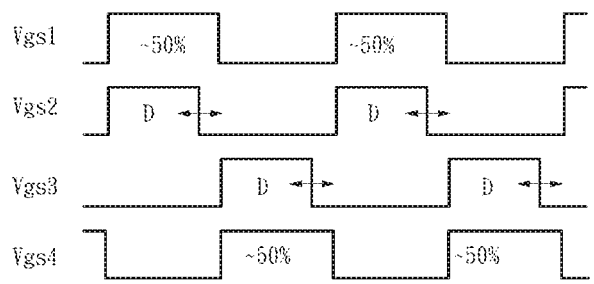

As shown in FIG. 9B, four gate driver signals (~50%, D, D, ~50%) are assigned to turn-on and turn-off the Q1, Q2, Q3, and Q4, respectively.

The anode and cathode of the first clamped diode D2 are respectively connected to the non-dot terminal of the second primary winding P2 and the midpoint of the second switch pair Q3-Q4. The anode and cathode of the second clamped diode D4 are respectively connected to the midpoint of the first switch pair Q1-Q2 and the non-dot terminal of the third primary winding P3.

Figure 9C:
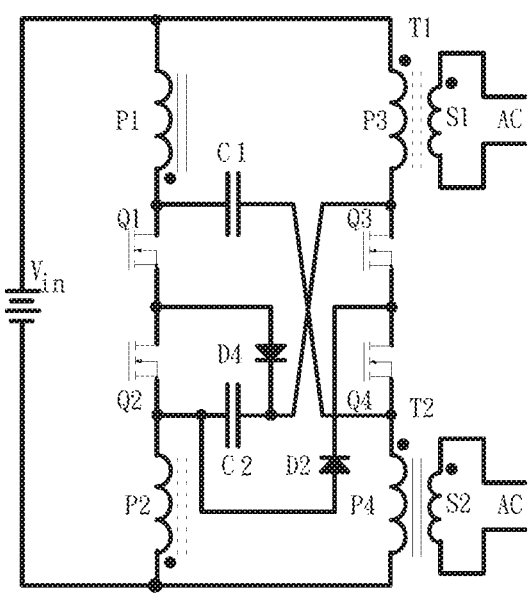
FIG. 9C shows a dual-transformer DC-AC inversion circuit diagram as the fourth example according to the second embodiment of the present invention.

The fourth example of the second embodiment to that shown in FIG. 9A is depicted in FIG. 9C. The single transformer T1 has been replaced with dual transformers T1 and T2 for high output power applications. Primary windings P2-P3 and secondary winding S1 are coupled to the first transformer T1 while primary windings P1-P4 and secondary winding S2 are coupled to the second transformer T2. Secondary windings S1 and S2 may be connected in parallel or in series to generate the required AC voltage.

Figure 10A:
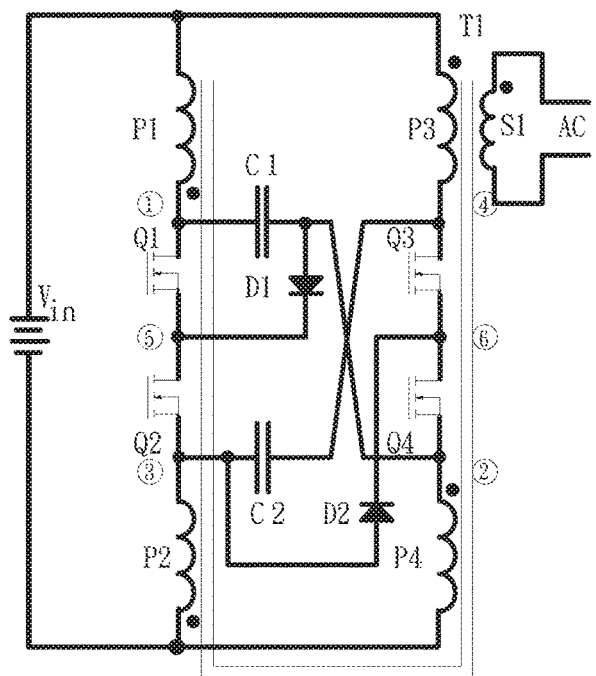
FIG. 10A and FIG. 10B show a single-transformer DC-AC inversion circuit diagram with its gate driver timing diagram as the fifth example according to the second embodiment of the present invention, respectively.

The fifth example of the second embodiment is depicted in FIG. 10A. As shown, the first clamped diode and the second clamped diode connections with four-gate driver signal assignment are different from that of the circuit shown FIG. 8A and FIG. 8B.

Figure 10B:
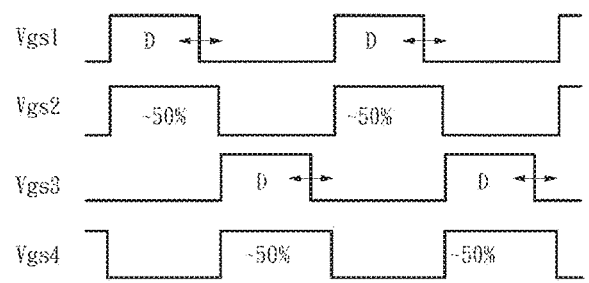

As shown in FIG. 10B, four gate driver signals (D, ~50%, D, ~50%) are assigned to turn-on and turn-off the Q1, Q2, Q3, and Q4, respectively.

The anode and cathode of the first clamped diode D1 are respectively connected to the dot terminal of the fourth primary winding P4 and the midpoint of the first switch pair Q1-Q2. The anode and cathode of the second clamped diode D2 are respectively connected to the non-dot terminal of the second primary winding P2 and the midpoint of the second switch pair Q3-Q4.

Figure 10C:
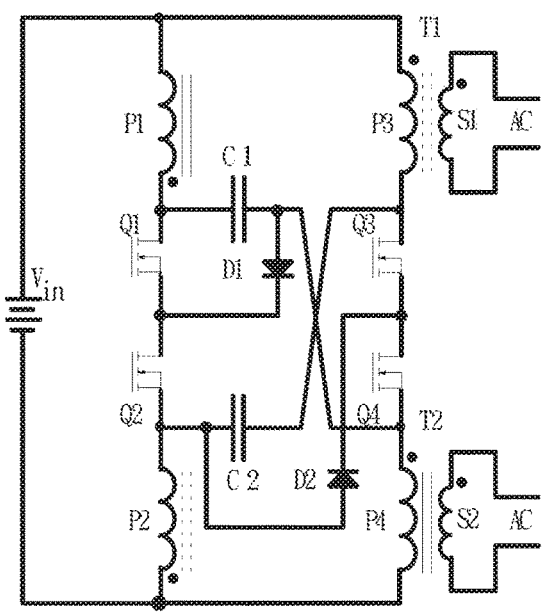
FIG. 10C shows a dual-transformer DC-AC inversion circuit diagram as the sixth example according to the second embodiment of the present invention.

The sixth example of the second embodiment to that shown in FIG. 10A is depicted in FIG. 10C. The single transformer T1 has been replaced with dual transformers T1 and T2 for high output power applications. Primary windings P2-P3 and secondary winding S1 are coupled to the first transformer T1 while primary windings P1-P4 and secondary winding S2 are coupled to the second transformer T2. Secondary windings S1 and S2 may be connected in parallel or in series to generate the required AC voltage.

Figure 11A:
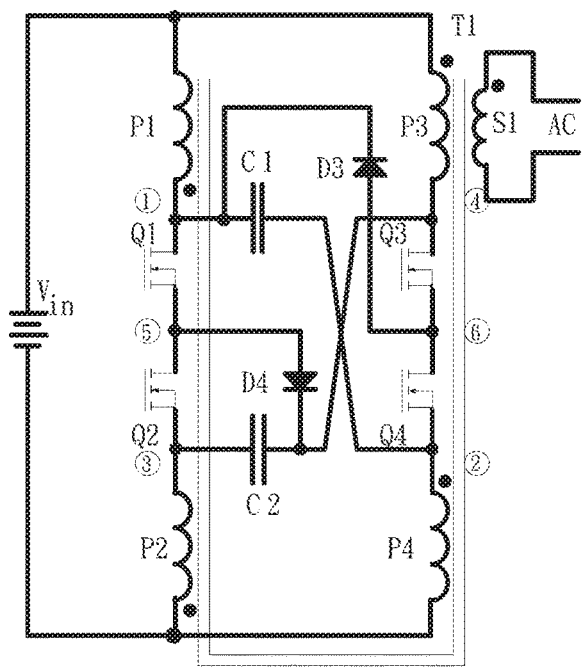
FIG. 11A and FIG. 11B show a single-transformer DC-AC inversion circuit diagram with its gate driver timing diagram as the seventh example according to the second embodiment of the present invention, respectively.

The seventh example of the second embodiment is depicted in FIG. 11A. As shown, the first clamped diode and the second clamped diode connections with four-gate driver signal assignment are different from that of the circuit shown FIG. 8A and FIG. 8B.

Figure 11B:
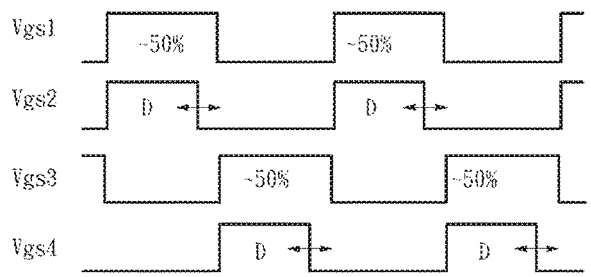

As shown in FIG. 11B, four gate driver signals (~50%, D, ~50%, D) are assigned to turn-on and turn-off the Q1, Q2, Q3, and Q4, respectively.

The anode and cathode of the first clamped diode D3 are respectively connected to the midpoint of the second switch pair Q3-Q4 and dot terminal of the first primary winding P1. The anode and cathode of the second clamped diode D4 are respectively connected to the midpoint of the first switch pair Q1-Q2 and the non-dot terminal of the third primary winding P3.

Figure 11C:
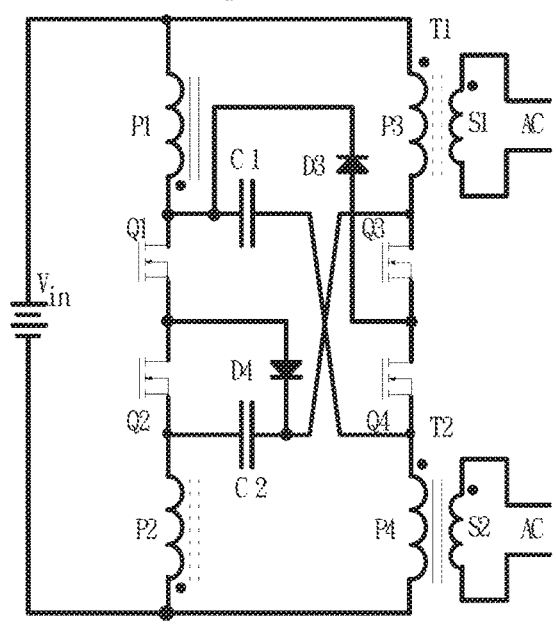
FIG. 11C shows a dual-transformer DC-AC inversion circuit diagram as the eighth example according to the second embodiment of the present invention.

The eighth example of the second embodiment to that shown in FIG. 11A is depicted in FIG. 11C. The single transformer T1 has been replaced with dual transformers T1 and T2 for high output power applications. Primary windings P2-P3 and secondary winding S1 are coupled to the first transformer T1 while primary windings P1-P4 and secondary winding S2 are coupled to the second transformer T2. Secondary windings S1 and S2 may be connected in parallel or in series to generate the required AC voltage.

Although the inversion circuits as shown from FIG. 8A to FIG. 11C are operated with four different clamped diode connections with their respective gate diver signals assigned to the switches or with one or two transformers for different output power applications, these circuits will share the same operating principle. Accordingly, it will be described by using the circuit as shown in FIG. 8A, the first example of the second embodiment of the present invention.

FIG. 12A to FIG. 12F show the equivalent circuits under stead-state operating conditions according to the first example of the second embodiment of the present invention. It has six operating stages.

Figure 12A:
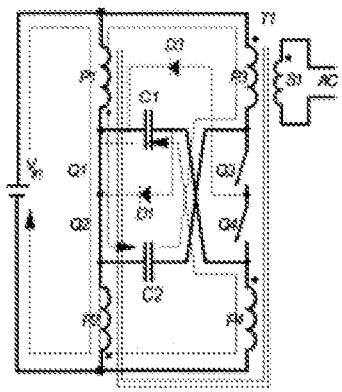
FIG. 12A to FIG. 12F show six equivalent circuits of the DC-AC inversion circuit in FIG. 8A under steady-state operating conditions when the switches are turned on and turned off, respectively.

Referring to FIG. 12A, the drive signals generated by the controller turn on both Q1 and Q2. Therefore, the voltage source Vin provides the voltage on primary windings P1 and P2. At the same time, the voltage across the coupling capacitor C1 provide the voltage on primary windings P2 and P4. The voltage across the coupling capacitor C2 provide the voltage on primary windings P3 and P1. In this time interval, the coupling capacitors C1 and C2 are discharged their energies to the load.

Figure 12B:
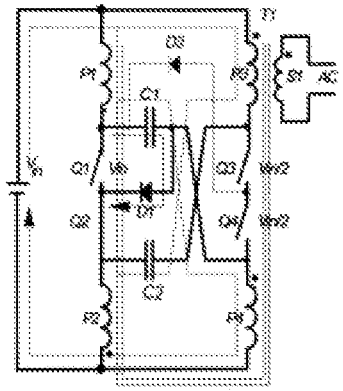

Referring to FIG. 12B, the pulse width modulation signal D generated by the controller turns Q1 off, but keeps Q2 on, and the coupling capacitors C1 and C2 will be charged to the voltage source Vin. The voltage on the Q1 will rise. When the voltage is higher than the input voltage (across C1), the first clamped diode D1 is turned on due to the forward bias. Therefore, the primary windings P4 and P2 of the transformer are short-circuited. The first primary winding, the second primary winding, the third primary winding, and the fourth primary winding have the same number of turns. Since the voltage of the first primary winding P1 (second primary winding P2) is opposite to the polarity of the voltage of the fourth primary winding P4 (the third primary winding P3), they cancel each other out. Therefore, the average voltages across the coupling capacitors, C1 and C2, are equal to the input voltage. Check the loop of VC1(+)−Q1−

Q2–VC2–Q3–Q4–VC1(−), because VQ1=VC1=Vin, and VQ2=0, VQ3+VQ4=VC2=Vin, which leads to Vin/2 voltage on Q3 and Q4 in this time interval.

Figure 12C:
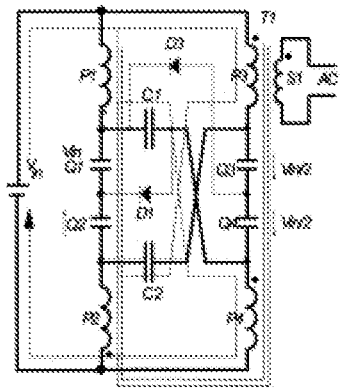

Referring to FIG. 12C, this time interval is the dead time interval. The coupling capacitors C1 and C2 are kept charging by the voltage source Vin and the energy stored in the leakage inductance. The near 50% pulse width signal provided by the controller ends, causing Q2 to turn off. Q2 voltage will rise and Q3 voltage as well as Q4 voltage is dropped. If there is a proper dead time interval and sufficient leakage inductance energy, Q3 and Q4 will achieve zero voltage switching operating condition.

Figure 12D:
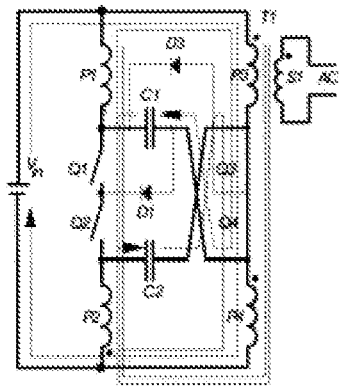

Referring to FIG. 12D, the drive signals generated by the controller turn on both Q3 and Q4. Therefore, the voltage source Vin provides the voltage on primary windings P3 and P4. At the same time, the voltage across the coupling capacitor C1 provide the voltage on primary windings P1 and P3. The voltage across the coupling capacitor C2 provide the voltage on primary windings P2 and P4. In this time interval, the coupling capacitors C1 and C2 are discharged their energies to the load.

Figure 12E:
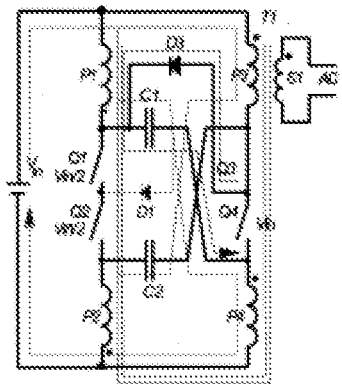

Referring to FIG. 12E, the pulse width modulation signal D generated by the controller turns Q4 off, but keeps Q3 on, and the coupling capacitors C1 and C2 will be charged to the voltage source Vin. The voltage on the Q4 will rise. When the voltage is higher than the input voltage (across C1), the second clamped diode D3 is turned on due to the forward bias. Therefore, the primary windings P1 and P3 of the transformer are short-circuited. The first primary winding, the second primary winding, the third primary winding, and the fourth primary winding have the same number of turns. Since the voltage of the first primary winding P1 (second primary winding P2) is opposite to the polarity of the voltage of the fourth primary winding P4 (the third primary winding P3), they cancel each other out. Therefore, the average voltages across the coupling capacitors, C1 and C2, are equal to the input voltage. Check the loop of VC1(+)–Q1–Q2–VC2–Q3–Q4–VC1(−), because VQ4=VC1=Vin, and VQ3=0, VQ1+VQ2=VC2=Vin, which leads to Vin/2 voltage on Q1 and Q2 in this time interval.

Figure 12F:
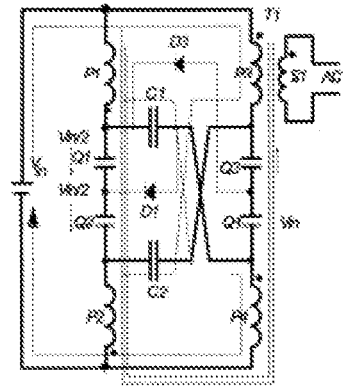

Referring to FIG. 12F, this time interval is the dead time interval. The coupling capacitors C1 and C2 are kept charging by the voltage source Vin and the energy stored in the leakage inductance. The near 50% pulse width signal provided by the controller ends, causing Q3 to turn off. Q3 voltage will rise and Q1 voltage as well as Q2 voltage is dropped. If there is a proper dead time interval and sufficient leakage inductance energy, Q1 and Q2 will achieve zero voltage switching operating condition.

Figure 13:
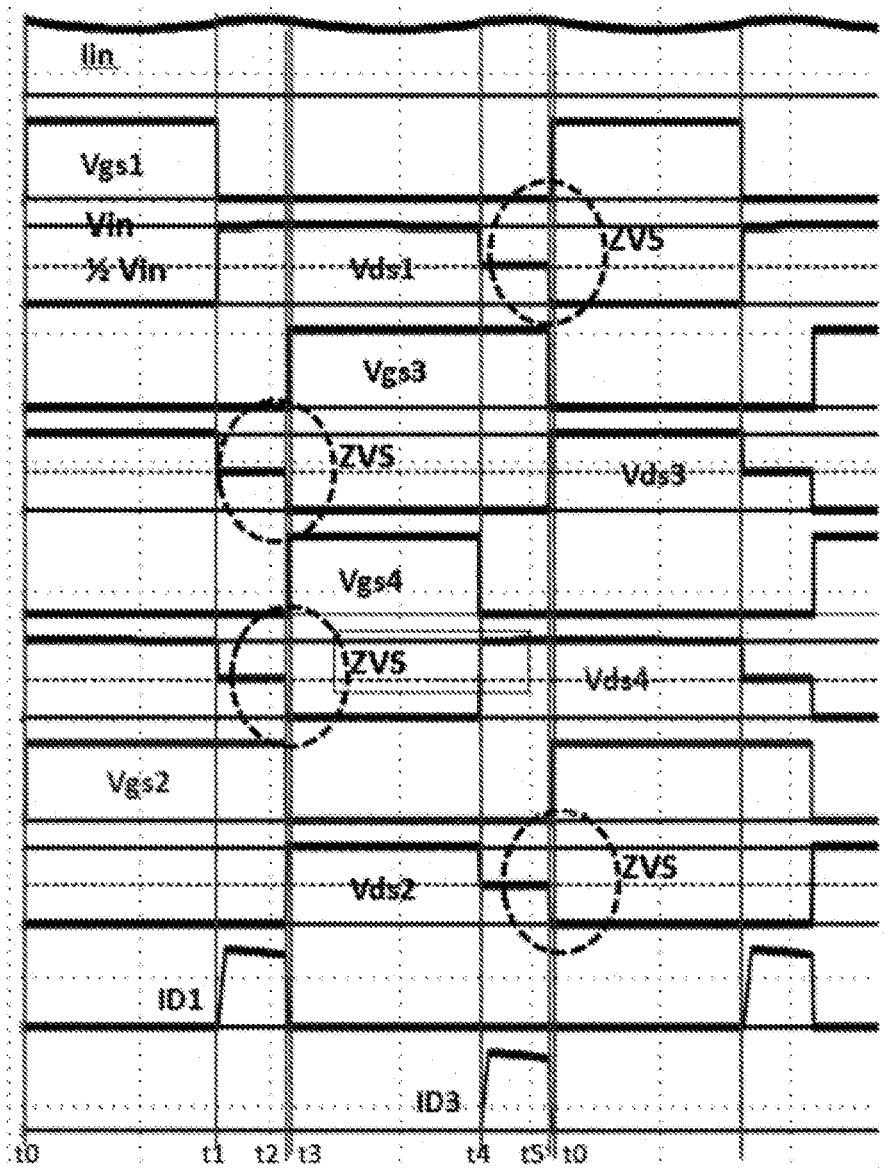
FIG. 13 and FIG. 14 show several key voltage and current waveforms of the DC-AC inversion circuit in FIG. 8A under full load and light load operating conditions, respectively.
Figure 14:
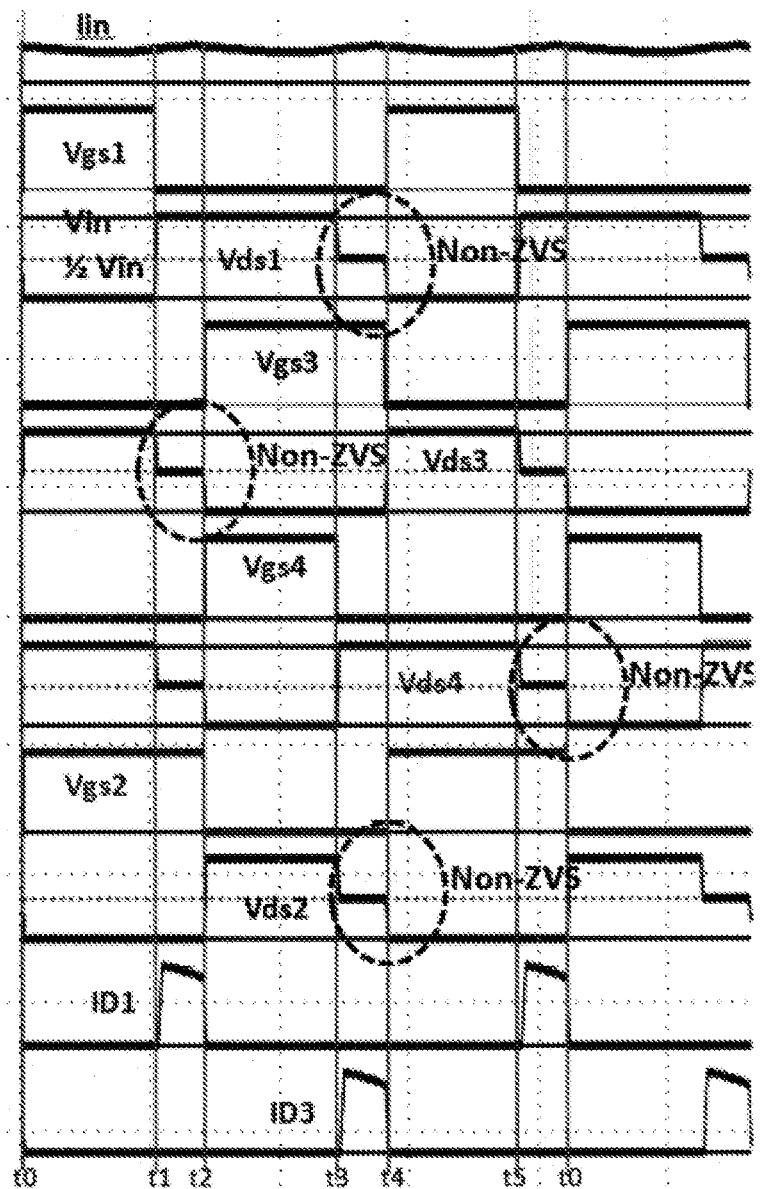

Referring to FIG. 13 and FIG. 14, several key waveforms of the inverter circuit are depicted by running Simplis simulation under heavy load and light load operating conditions, respectively. As shown, ZVS is achieved under heavy load operating condition. On the contrary, it is non-ZVS under light load operation condition. However, the voltage on each switch at the turn-on instant is reduced to half of the input voltage. The switching loss is thus reduced and thereby improving the efficiency under light load operation condition.

While the invention has been described in detail herein in accordance with certain preferred embodiments thereof. However, the present invention is not limited to this. Therefore, anyone familiar with the art can easily think of the aforementioned equivalent changes or modifications in the field of the invention. For example, the MOSFET used as the semiconductor switching devices can also implement with other newly developed or equivalent functional elements according to their applications. Moreover, the diode used as the rectifier can also implement with the MOSFET or equivalent functional elements according to their applications. Accordingly, it is intended by the appended claims to cover all such modifications and changes as fall within the true spirit and scope of the invention.

What is claimed is:

1. A soft-switching and low input current ripple power inversion circuit for converting a DC voltage received at a DC input to an AC voltage, which is paralleled-connected to the DC input, and includes:
    a first series circuit connected in parallel with said DC input and includes a first switch, a second switch, and a first transformer primary connected in series;
    a second series circuit connected in parallel with said DC input and includes a second transformer primary, a third switch, and a fourth switch connected in series;
    a first driver signal pair includes a first pulse-width modulation driver signal and a first near 50% duty cycle driver signal used to turn-on and turn-off of said first switch and said second switch in the first series circuit;
    a second driver signal pair includes a second pulse-width modulation driver signal and a second near 50% duty cycle driver signal used to turn-on and turn-off of said third switch and said fourth switch in the second series circuit;
    said two driver signals of the first driver signal pair and said two driver signals of the second driver signal pair are synchronous to each other with 180 degree phase-shift;
    at least one transformer secondary are magnetically coupled to said transformer primaries and providing said AC voltage;
    two terminals of a first capacitor are respectively connected to a first node of the first series circuit and a second node in the second series circuit, wherein said first node is a connection of said second switch and said first transformer primary, and wherein said second node is a connection of said second transformer primary and said third switch.

2. The soft-switching and low input current ripple power inversion circuit as claimed in claim 1, further including a first clamped diode and a second clamped diode, wherein an anode and a cathode of said first clamped diode are respectively connected to a negative terminal of said DC input and a third node in the first series circuit, wherein said third node is a connection of said first switch and said second switch, and wherein an anode and a cathode of said second clamped diode are respectively connected to a fourth node in the second series circuit and a positive terminal of said DC input, wherein said fourth node is a connection of said third switch and said fourth switch, wherein said first pulse-width modulation driver signal is used to turn-on and turn-off said first switch, wherein said first near 50% duty cycle driver signal is used to turn-on and turn-off said second switch, wherein said second near 50% duty cycle driver signal is used to turn-on and turn-off said third switch, wherein said second pulse-width modulation driver signal is used to turn-on and turn-off said fourth switch, wherein said first transformer primary, said second transformer primary, and said at least one transformer secondary are magnetically coupled to a first transformer.

3. The soft-switching and low input current ripple power inversion circuit as claimed in claim 1, further including a first clamped diode and a second clamped diode, wherein an anode and an cathode of said first clamped diode are respectively connected to a negative terminal of said DC input and a third node in the first series circuit, wherein said third node is a connection of said first switch and said second switch, and wherein a anode and a cathode of said second clamped diode are respectively connected to a fourth node in the second series circuit and a positive terminal of said DC input, wherein said fourth node is a connection of said third switch and said fourth switch, wherein said first pulse-width modulation driver signal is used to turn-on and turn-off said first switch, wherein said first near 50% duty cycle driver signal is used to turn-on and turn-off said second switch, wherein said second near 50% duty cycle driver signal is used to turn-on and turn-off said third switch, wherein said second pulse-width modulation driver signal is used to turn-on and turn-off said fourth switch, wherein said second transformer primary and one of said at least a transformer secondary are magnetically coupled to a first transformer, and wherein said first transformer primary and another one of said at least one transformer secondary are magnetically coupled to a second transformer.

4. The soft-switching and low input current ripple power inversion circuit as claimed in claim 1, further including a first clamped diode and a second clamped diode, wherein an anode and a cathode of said first clamped diode are respectively connected to a third node in the first series circuit and a second node in the second series circuit, wherein said third node is a connection of said first switch and said second switch, wherein said second node is a connection of said second transformer primary and said third switch, and wherein an anode and a cathode of said second clamped diode are respectively connected to a first node in the first series circuit and a fourth node in the second series circuit, wherein said first node is a connection of said second switch and said first transformer primary, and wherein said fourth node is a connection of said third switch and said fourth switch, wherein said first near 50% duty cycle driver signal is used to turn-on and turn-off said first switch, wherein said first pulse-width modulation driver signal is used to turn-on and turn-off said second switch, wherein said second pulse-width modulation driver signal is used to turn-on and turn-off said third switch, wherein said second near 50% duty cycle driver signal is used to turn-on and turn-off said fourth switch, wherein said first transformer primary, said second transformer primary, and said at least one transformer secondary are magnetically coupled to a first transformer.

5. The soft-switching and low input current ripple power inversion circuit as claimed in claim 1, further including a first clamped diode and a second clamped diode, wherein an anode and a cathode of said first clamped diode are respectively connected to a third node in the first series circuit and a second node in the second series circuit, wherein said third node is a connection of said first switch and said second switch, wherein said second node is a connection of said second transformer primary and said third switch, and wherein an anode and a cathode of said second clamped diode are respectively connected to a first node in the first series circuit and a fourth node in the second series circuit, wherein said first node is a connection of said second switch and said first transformer primary, and wherein said fourth node is a connection of said third switch and said fourth switch, wherein said first near 50% duty cycle driver signal is used to turn-on and turn-off said first switch, wherein said first pulse-width modulation driver signal is used to turn-on and turn-off said second switch, wherein said second pulse-width modulation driver signal is used to turn-on and turn-off said third switch, wherein said second near 50% duty cycle driver signal is used to turn-on and turn-off said fourth switch, wherein said second transformer primary and one of said at least one transformer secondary are magnetically coupled to a first transformer, and wherein said first transformer primary and another one of said at least one transformer secondary are magnetically coupled to a second transformer.

6. The soft-switching and low input current ripple power inversion circuit as claimed in claim 1, further including a first clamped diode and a second clamped diode, wherein an anode and a cathode of said first clamped diode are respectively connected to a negative terminal of said DC input and a third node in the first series circuit, wherein said third node is a connection of said first switch and said second switch, and wherein an anode and a cathode of said second clamped diode are respectively connected to a first node in the first series circuit and a fourth node in the second series circuit, wherein said first node is a connection of said second switch and said first transformer primary, wherein said fourth node is a connection of said third switch and said fourth switch, wherein said first pulse-width modulation driver signal is used to turn-on and turn-off said first switch, wherein said first near 50% duty cycle driver signal is used to turn-on and turn-off said second switch, wherein said second pulse-width modulation driver signal is used to turn-on and turn-off said third switch, wherein said second near 50% duty cycle driver signal is used to turn-on and turn-off said fourth switch, wherein said first transformer primary, said second transformer primary, and said at least one transformer secondary are magnetically coupled to a first transformer.

7. The soft-switching and low input current ripple power inversion circuit as claimed in claim 1, further including a first clamped diode and a second clamped diode, wherein an anode and a cathode of said first clamped diode are respectively connected to a negative terminal of said DC input and a third node in the first series circuit, wherein said third node is a connection of said first switch and said second switch, and wherein an anode and a cathode of said second clamped diode are respectively connected to a first node in the first series circuit and a fourth node in the second series circuit, wherein said first node is a connection of said second switch and said first transformer primary, wherein said fourth node is a connection of said third switch and said fourth switch, wherein said first pulse-width modulation driver signal is used to turn-on and turn-off said first switch, wherein said first near 50% duty cycle driver signal is used to turn-on and turn-off said second switch, wherein said second pulse-width modulation driver signal is used to turn-on and turn-off said third switch, wherein said second near 50% duty cycle driver signal is used to turn-on and turn-off said fourth switch, said second transformer primary and one of said at least one transformer secondary are magnetically coupled to a first transformer, and wherein said first transformer primary and another one of said at least one transformer secondary are magnetically coupled to a second transformer.

8. The soft-switching and low input current ripple power inversion circuit as claimed in claim 1, further including a first clamped diode and a second clamped diode, wherein an anode and a cathode of said first clamped diode are respectively connected to a third node in the first series circuit and a second node in the second series circuit, wherein said third node is a connection of said first switch and said second switch, wherein said second node is a connection of said second transformer primary and said third switch, and wherein an anode and a cathode of said second clamped diode are respectively connected to a fourth node in the second series circuit and a positive terminal of said DC input, wherein said fourth node is a connection of said third switch and said fourth switch, wherein said first near 50% duty cycle driver signal is used to turn-on and turn-off said first switch, wherein said first pulse-width modulation driver signal is used to turn-on and turn-off said second switch, wherein said second near 50% duty cycle driver signal is used to turn-on and turn-off said third switch, wherein said second pulse-width modulation driver signal is used to turn-on and turn-off said fourth switch, wherein said first transformer primary, said second transformer primary, and said at least one transformer secondary are magnetically coupled to a first transformer.

9. The soft-switching and low input current ripple power inversion circuit as claimed in claim 1, further including a first clamped diode and a second clamped diode, wherein an anode and a cathode of said first clamped diode are respectively connected to a third node in the first series circuit and a second node in the second series circuit, wherein said third node is a connection of said first switch and said second switch, wherein said second node is a connection of said second transformer primary and said third switch, and wherein an anode and a cathode of said second clamped diode are respectively connected to a fourth node in the second series circuit and a positive terminal of said DC input, wherein said fourth node is a connection of said third switch and said fourth switch, wherein said first near 50% duty cycle driver signal is used to turn-on and turn-off said first switch, wherein said first pulse-width modulation driver signal is used to turn-on and turn-off said second switch, wherein said second near 50% duty cycle driver signal is used to turn-on and turn-off said third switch, wherein said second pulse-width modulation driver signal is used to turn-on and turn-off said fourth switch, wherein said second transformer primary and one of said at least one transformer secondary are magnetically coupled to a first transformer, and wherein said first transformer primary and another one of said at least one second transformer secondary are magnetically coupled to a second transformer.

10. A soft-switching and low input current ripple power inversion circuit for converting a DC voltage received at a DC input to an AC voltage, which is paralleled-connected to the DC input, and includes:
a first series circuit connected in parallel with said DC input and includes a first transformer primary, a first switch, a second switch, and a second transformer primary connected in series;
a second series circuit connected in parallel with said DC input and includes a third transformer primary, a third switch, a fourth switch, and a fourth transformer primary connected in series;
a first driver signal pair includes a first pulse-width modulation driver signal and a first near 50% duty cycle driver signal used to turn-on and turn-off of said first switch and said second switch in the first series circuit;
a second driver signal pair includes a second pulse-width modulation driver signal and a second near 50% duty cycle driver signal used to turn-on and turn-off of said third switch and said fourth switch in the second series circuit;
said two driver signals of the first driver signal pair and said two driver signals of the second driver signal pair are synchronous to each other with 180 degree phase-shift;
at least one transformer secondary magnetically coupled to said transformer primaries and providing said AC voltage;
two terminals of a first capacitor are respectively connected to a first node in the first series circuit and a second node of the second series circuit, wherein said first node is a connection of said first transformer primary and said first switch, and wherein said second node is a connection of said fourth switch and said fourth transformer primary;
two terminals of a second capacitor are respectively connected to a third node in the first series circuit and a fourth node of the second series circuit, wherein said third node is a connection of said second switch and said second transformer primary, and wherein said fourth node is a connection of said third transformer primary and said third switch.

11. The soft-switching and low input current ripple power inversion circuit as claimed in claim 10, further including a first clamped diode and a second clamped diode, wherein an anode and a cathode of said first clamped diode are respectively connected to a second node in the second series circuit and a fifth node in the first series circuit, wherein said second node is a connection of said fourth switch and said fourth transformer primary, wherein said fifth node is a connection of said first switch and said second switch, and wherein an anode and a cathode of said second clamped diode are respectively connected to a sixth node in the second series circuit and a first node in the first series circuit, wherein said sixth node is a connection of said third switch and said fourth switch, wherein said first node is a connection of said first transformer primary and said first switch, wherein said first pulse-width modulation driver signal is used to turn-on and turn-off said first switch, wherein said first near 50% duty cycle driver signal is used to turn-on and turn-off said second switch, wherein said second near 50% duty cycle driver signal is used to turn-on and turn-off said third switch, wherein said second pulse-width modulation driver signal is used to turn-on and turn-off said fourth switch, wherein said first transformer primary, said second transformer primary, said third transformer primary, and said fourth transformer primary, and said at least one transformer secondary are magnetically coupled to a first transformer.

12. The circuit soft-switching and low input current ripple power inversion circuit as claimed in claim 10, further including a first clamped diode and a second clamped diode, wherein an anode and a cathode of said first clamped diode are respectively connected to a second node in the second series circuit and a fifth node in the first series circuit, wherein said second node is a connection of said fourth switch and said fourth transformer primary, wherein said fifth node is a connection of said first switch and said second switch, and wherein an anode and a cathode of said second clamped diode are respectively connected to a sixth node in the second series circuit and a first node in the first series circuit, wherein said sixth node is a connection of said third switch and said fourth switch, wherein said first node is a connection of said first transformer primary and said first switch, wherein said first pulse-width modulation driver signal is used to turn-on and turn-off said first switch, wherein said first near 50% duty cycle driver signal is used to turn-on and turn-off said second switch, wherein said second near 50% duty cycle driver signal is used to turn-on and turn-off said third switch, wherein said second pulse-width modulation driver signal is used to turn-on and turn-off said fourth switch, wherein said second transformer primary, said third transformer primary, and one of said at least one transformer secondary are magnetically coupled to a first transformer, and wherein said first transformer primary, said fourth transformer primary and another one of said at least one transformer secondary are magnetically coupled to a second transformer.

13. The soft-switching and low input current ripple power inversion circuit as claimed in claim 10, further including a first clamped diode and a second clamped diode, wherein an anode and a cathode of said first clamped diode are respectively connected to a fifth node in the first series circuit and a fourth node in the second series circuit and, wherein said fifth node is a connection of said first switch and said second switch, wherein said fourth node is a connection of said third transformer primary and said third switch, and wherein an anode and a cathode of said second clamped diode are respectively connected to a third node in the first series circuit and a sixth node in the second series circuit, wherein said third node is a connection of said second switch and said second transformer primary, wherein said sixth node is a connection of said third switch and said fourth switch, wherein said first near 50% duty cycle driver signal is used to turn-on and turn-off said first switch, wherein said first pulse-width modulation driver signal is used to turn-on and turn-off said second switch, wherein said second pulse-width modulation driver signal is used to turn-on and turn-off said third switch, wherein said second near 50% duty cycle driver signal is used to turn-on and turn-off said fourth switch, wherein said first transformer primary, said second transformer primary, said third transformer primary, and said fourth transformer primary, and said at least one transformer secondary are magnetically coupled to a first transformer.

14. The soft-switching and low input current ripple power inversion circuit as claimed in claim 10, further including a first clamped diode and a second clamped diode, wherein an anode and a cathode of said first clamped diode are respectively connected to a fifth node in the first series circuit and a fourth node in the second series circuit and, wherein said fifth node is a connection of said first switch and said second switch, wherein said fourth node is a connection of said third transformer primary and said third switch, and wherein an anode and a cathode of said second clamped diode are respectively connected to a third node in the first series circuit and a sixth node in the second series circuit, wherein said third node is a connection of said second switch and said second transformer primary, wherein said sixth node is a connection of said third switch and said fourth switch, wherein said first near 50% duty cycle driver signal is used to turn-on and turn-off said first switch, wherein said first pulse-width modulation driver signal is used to turn-on and turn-off said second switch, wherein said second pulse-width modulation driver signal is used to turn-on and turn-off said third switch, wherein said second near 50% duty cycle driver signal is used to turn-on and turn-off said fourth switch, wherein said second transformer primary, said third transformer primary, and one of said at least one transformer secondary are magnetically coupled to a first transformer, and wherein said first transformer primary, said fourth transformer primary and another one said at least one transformer secondary are magnetically coupled to a second transformer.

15. The soft-switching and low input current ripple power inversion circuit as claimed in claim 10, further including a first clamped diode and a second clamped diode, wherein an anode and a cathode of said first clamped diode are respectively connected to a second node in the second series circuit and a fifth node in the first series circuit, wherein said second node is a connection of said fourth switch and said fourth transformer primary, wherein said fifth node is a connection of said first switch and said second switch, and wherein an anode and a cathode of said second clamped diode are respectively connected to a third node in the first series circuit and a sixth node in the second series circuit and, wherein said third node is a connection of said second switch and said second transformer primary, wherein said sixth node is a connection of said third switch and said fourth switch, wherein said first pulse-width modulation driver signal is used to turn-on and turn-off said first switch, wherein said first near 50% duty cycle driver signal is used to turn-on and turn-off said second switch, wherein said second pulse-width modulation driver signal is used to turn-on and turn-off said third switch, wherein said second near 50% duty cycle driver signal is used to turn-on and turn-off said fourth switch, wherein said first transformer primary, said second transformer primary, said third transformer primary, and said fourth transformer primary, and said at least one transformer secondary are magnetically coupled to a first transformer.

16. The soft-switching and low input current ripple power inversion circuit as claimed in claim 10, further including a first clamped diode and a second clamped diode, wherein an anode and a cathode of said first clamped diode are respectively connected to a second node in the second series circuit and a fifth node in the first series circuit, wherein said second node is a connection of said fourth switch and said fourth transformer primary, wherein said fifth node is a connection of said first switch and said second switch, and wherein an anode and a cathode of said second clamped diode are respectively connected to a third node in the first series circuit and a sixth node in the second series circuit and, wherein said third node is a connection of said second switch and said second transformer primary, wherein said sixth node is a connection of said third switch and said fourth switch, wherein said first pulse-width modulation driver signal is used to turn-on and turn-off said first switch, wherein said first near 50% duty cycle driver signal is used to turn-on and turn-off said second switch, wherein said second pulse-width modulation driver signal is used to turn-on and turn-off said third switch, wherein said second near 50% duty cycle driver signal is used to turn-on and turn-off said fourth switch, wherein said second transformer primary, said third transformer primary, and one of said at least one transformer secondary are magnetically coupled to a first transformer, and wherein said first transformer primary, said fourth transformer primary and another one of said at least one transformer secondary are magnetically coupled to a second transformer.

17. The soft-switching and low input current ripple power inversion circuit as claimed in claim 10, further including a first clamped diode and a second clamped diode, wherein an anode and a cathode of said first clamped diode are respectively connected to a fifth node in the first series circuit and a fourth node in the second series circuit, wherein said fifth node is a connection of said first switch and said second switch, wherein said fourth node is a connection of said third transformer primary and said third switch, and wherein an anode and a cathode of said second clamped diode are respectively connected to a sixth node in the second series circuit and a first node in the first series circuit, wherein said sixth node is a connection of said third switch and said fourth switch, wherein said first node is a connection of said first transformer primary and said first switch, wherein said first near 50% duty cycle driver signal is used to turn-on and turn-off said first switch, wherein said first pulse-width modulation driver signal is used to turn-on and turn-off said second switch, wherein said second near 50% duty cycle driver signal is used to turn-on and turn-off said third switch, wherein said second pulse-width modulation driver signal is used to turn-on and turn-off said fourth switch, wherein said first transformer primary, said second transformer primary, said third transformer primary, and said fourth transformer primary, and said at least one transformer secondary are magnetically coupled to a first transformer.

18. The soft-switching and low input current ripple power inversion circuit as claimed in claim 10, further including a first clamped diode and a second clamped diode, wherein an anode and a cathode of said first clamped diode are respectively connected to a fifth node in the first series circuit and a fourth node in the second series circuit, wherein said fifth node is a connection of said first switch and said second switch, wherein said fourth node is a connection of said third transformer primary and said third switch, and wherein an anode and a cathode of said second clamped diode are respectively connected to a sixth node in the second series circuit and a first node in the first series circuit, wherein said sixth node is a connection of said third switch and said fourth switch, wherein said first node is a connection of said first transformer primary and said first switch, wherein said first near 50% duty cycle driver signal is used to turn-on and turn-off said first switch, wherein said first pulse-width modulation driver signal is used to turn-on and turn-off said second switch, wherein said second near 50% duty cycle driver signal is used to turn-on and turn-off said third switch, wherein said second pulse-width modulation driver signal is used to turn-on and turn-off said fourth switch, wherein said second transformer primary, said third transformer primary, and one of said at least a transformer secondary are magnetically coupled to a first transformer, and wherein said first transformer primary, said fourth transformer primary and another one of said at least one transformer secondary are magnetically coupled to a second transformer.

* * * * *